(12) United States Patent
Reinert

(10) Patent No.: US 8,293,424 B2
(45) Date of Patent: Oct. 23, 2012

(54) FLOW FIELD UNIT FOR A FUEL CELL STACK

(75) Inventor: Andreas Reinert, Dresden (DE)

(73) Assignee: STAXERA GmbH, Dresden (DE)

( * ) Notice: Subject to any disclaimer, the term of this patent is extended or adjusted under 35 U.S.C. 154(b) by 400 days.

(21) Appl. No.: 12/599,188

(22) PCT Filed: May 13, 2008

(86) PCT No.: PCT/DE2008/000820
§ 371 (c)(1),
(2), (4) Date: Nov. 6, 2009

(87) PCT Pub. No.: WO2008/151591
PCT Pub. Date: Dec. 18, 2008

(65) Prior Publication Data
US 2010/0285383 A1   Nov. 11, 2010

(30) Foreign Application Priority Data

Jun. 11, 2007 (DE) .......................... 10 2007 026 850
Jul. 16, 2007 (DE) .......................... 10 2007 033 042

(51) Int. Cl.
*H01M 8/02* (2006.01)
*H01M 2/18* (2006.01)
(52) U.S. Cl. ......... 429/457; 429/458; 429/514; 429/518
(58) Field of Classification Search .......... 429/455–458, 429/512–514, 517–522
See application file for complete search history.

(56) References Cited

U.S. PATENT DOCUMENTS

| | | | |
|---|---|---|---|
| 5,376,472 A * | 12/1994 | Hartvigsen et al. ........... | 429/514 |
| 2003/0064266 A1 | 4/2003 | Ogami et al. | |
| 2004/0115513 A1 | 6/2004 | Yang | |
| 2006/0024550 A1 * | 2/2006 | Rock et al. ...................... | 429/34 |
| 2006/0054221 A1 | 3/2006 | Steidle et al. | |
| 2007/0009779 A1 | 1/2007 | Mohri et al. | |
| 2007/0160894 A1 | 7/2007 | Park et al. | |
| 2007/0264557 A1 | 11/2007 | Kobayashi et al. | |

FOREIGN PATENT DOCUMENTS

| | | |
|---|---|---|
| CA | 2 529 799 A1 | 12/2004 |
| CA | 2 585 648 A1 | 7/2006 |

(Continued)

OTHER PUBLICATIONS

International Search Report dated Oct. 29, 2008.

*Primary Examiner* — Keith Walker
(74) *Attorney, Agent, or Firm* — Fitch, Even, Tabin & Flannery, LLP

(57) ABSTRACT

The invention relates to a repeating unit for a fuel cell stack comprising a membrane electrode assembly and a flow field designed to supply an active surface of the membrane electrode assembly with gas and comprising at least a gas passage orifice. According to the invention it is contemplated that a gas-tight gas flow barrier is disposed between the active surface and the gas passage orifice so that gas passing through the first gas passage orifice flows around the gas flow barrier, wherein the projection of the gas flow barrier towards the periphery of the active surface is at least half as long as the projection of the gas passage orifice towards the periphery of the active surface.

11 Claims, 5 Drawing Sheets

FOREIGN PATENT DOCUMENTS

| | | |
|---|---|---|
| DE | 10 2005 026 060 A1 | 11/2006 |
| EP | 1 278 258 A2 | 1/2003 |
| EP | 1653543 A2 | 5/2006 |
| JP | 2007207731 A | 8/2007 |
| WO | WO 02/069426 A2 | 9/2002 |
| WO | WO 2006/040994 A1 | 4/2006 |
| WO | WO 2008/040835 A1 | 4/2008 |

* cited by examiner

STATE OF THE ART

STATE OF THE ART

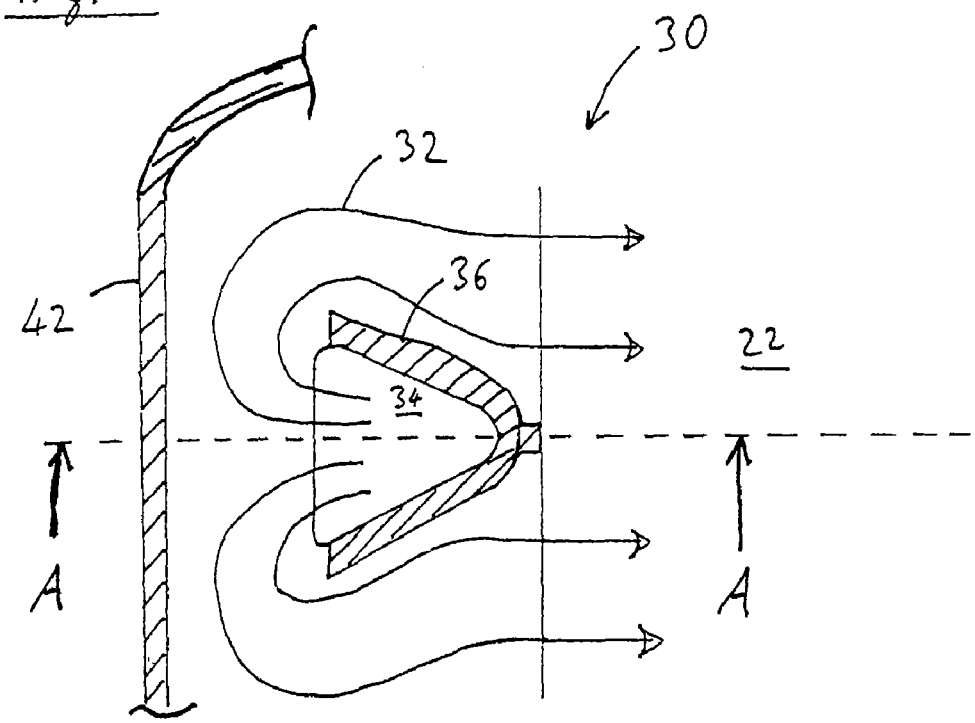
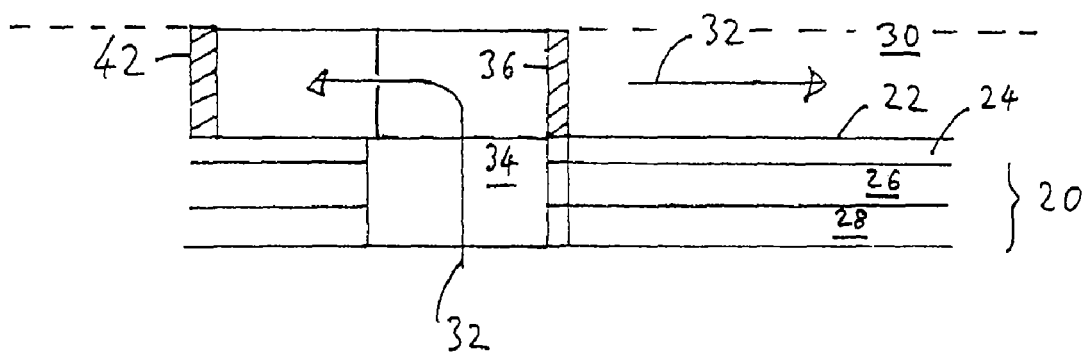

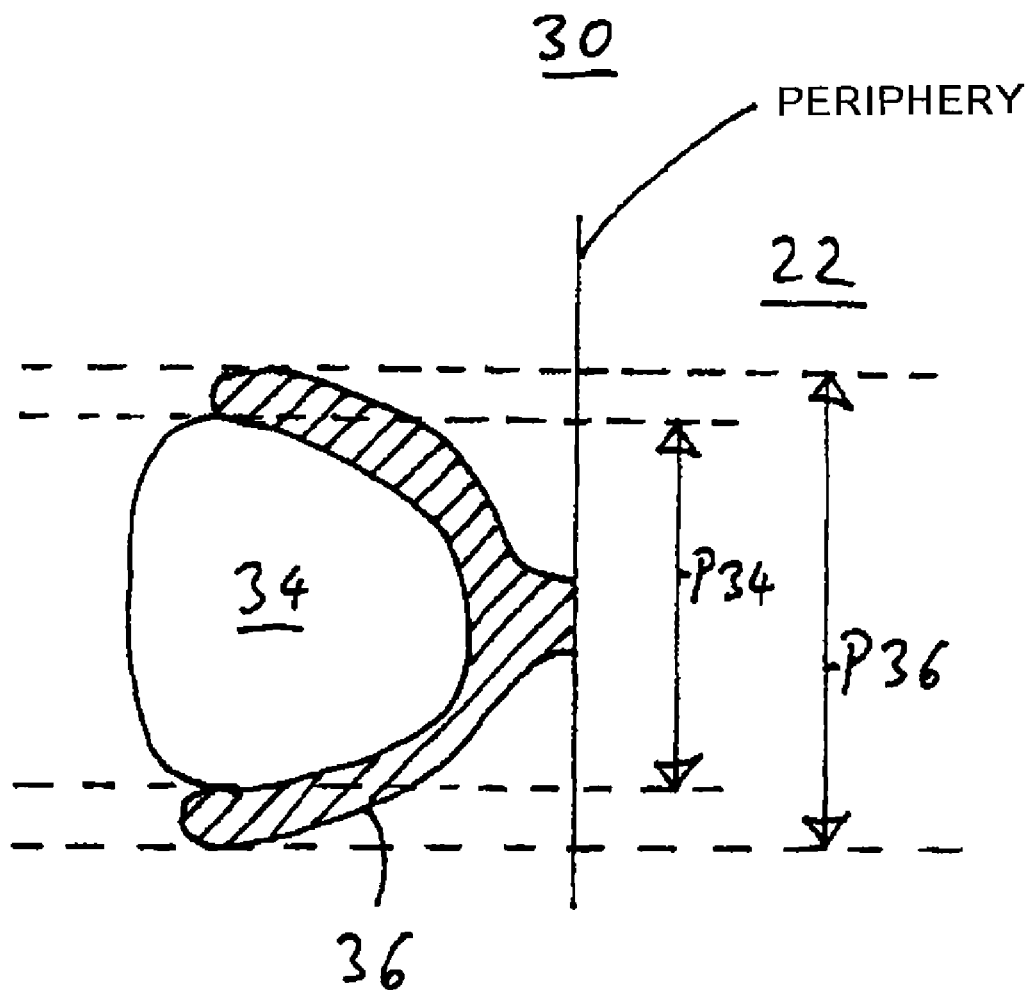

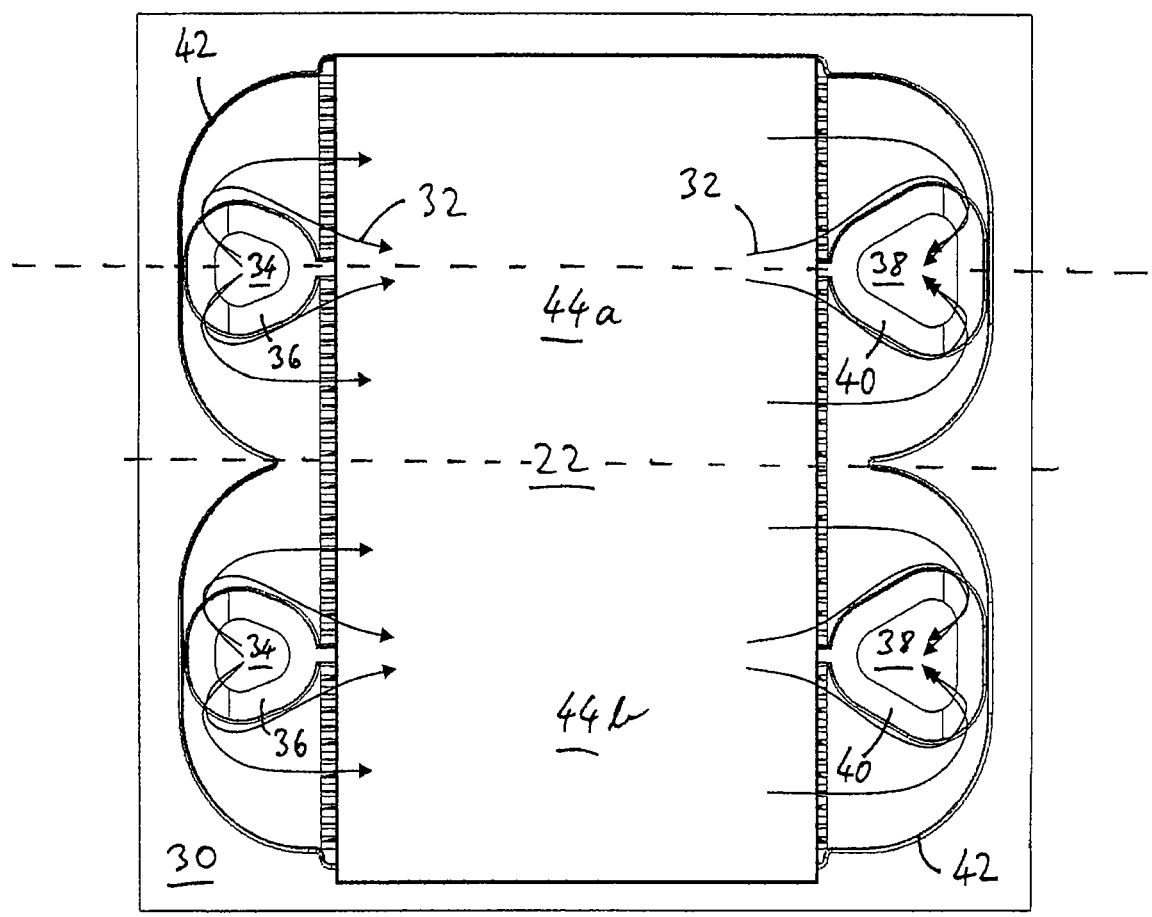

FLOW FIELD UNIT FOR A FUEL CELL STACK

CROSS-REFERENCE TO RELATED APPLICATIONS

This Application is a U.S. national phase application filed under 35 U.S.C. §371 of International Application No. PCT/DE2008/000820, filed May 13, 2008, designating the United States, which claims priority from German Patent Application Nos.: DE 10 2007 026 850.7, filed Jun. 11, 2007 and DE 10 2007 033 042.3, filed Jul. 16, 2007, which are hereby incorporated herein by reference in their entirety for all purposes.

The invention relates to a repeating unit for a fuel cell stack comprising a membrane electrode assembly and a flow field designed for supplying an active surface of the membrane electrode assembly with a gas and comprising at least one first gas passage orifice.

Fuel stacks, like batteries, serve to directly convert chemical energy into electric energy. The centre piece of a fuel stack is the membrane electrode assembly (MEA) consisting of an anode layer, a cathode layer as well as of an electrolyte membrane separating the anode layer from the cathode layer. For generating power the anode layer is supplied with combustion gas, for example hydrogen, while the cathode layer is supplied with an oxidising gas, for example air. In this connection an oxidation of combustion gas at the anode occurs, the electrons discharged by the combustion gas migrating from the anode to the cathode where they reduce the oxidising gas via an electrically conductive connection. The negative oxidising gas ions generated in this connection will then combine with the positively charged combustion gas ions. If, for example, hydrogen $H_2$ is used as the combustion gas and oxygen $O_2$ is used as the oxidising gas oxygen ions $O^{2-}$ in and at the anode layer will combine to form water molecules $H_2O$ together with hydrogen ions $H^+$ in case of a solid oxide fuel cell (SOFC). The energy set free thereby can be used by connecting a consumer load between the anode and the cathode.

The part of the anode surface or of the cathode surface in which combustion gas or oxidising gas is absorbed will be referred to as the "active surface" below.

Since the individual fuel cell provides only a small electric voltage (typically between 0.1 V and 1 V) it is common to electrically connect a plurality of fuel cells in the form of a fuel cell stack in series so that the voltages of the individual fuel cells of the stack accumulate. In this connection the cathode layer of one fuel cell is respectively connected to the anode layer of the adjacent fuel cell via a bipolar plate. Inside of the bipolar plate or adjacent to the bipolar plate a flow field for distributing combustion gas and oxidising gas to two adjacent fuel cells are disposed. The fuel cell stack therefore comprises a plurality of identical repeating units, each repeating unit comprising a membrane electrolyte assembly (MEA) and a bipolar plate preferably forming or defining two flow fields.

The state of the art knows different embodiments of flow fields by means of which a supply of the entire active surface with gas which is as uniform as possible and an optimum pressure and temperature distribution inside of the fuel cell stack are to be ensured.

A good uniform distribution of the gas at the electrode surface of each fuel cell of the fuel cell stack and inside of the stack can be supported by different means such as, for example:

- the utilisation of a bottle neck for generating a kinetic pressure, comparable to a shower head. This, however, has the disadvantage of an increased pressure loss and thus an increased additional consumption of the fuel cell stack since the fan performance required for the operation is proportional to the pressure loss.
- the arrangement of a very large number of inlet orifices whereby the inlet area (distribution area) is displaced towards the upstream side.
- the introduction of the gas through a diffuser gradually expanding the gas flowing through it.

The introduction of a bottle neck for generating a kinetic pressure is hard to realise in case of a solid oxide fuel cell stack (SOFC-Stack). A bottle neck would have to be manufactured in a particularly precise manner since even slight deviations of its cross section could lead to significant differences with respect to the pressure loss and therefore the distribution of the gas. Furthermore a significant pressure loss at a fuel stack is, as mentioned above, undesirable due to the required increased fan performance.

In the generic repeating units the gas for supplying the active surface (which is assumed to be disposed horizontally here) first flows vertically from circular gas passage orifices adjacent to the electrode layer to the area adjacent the active part of the electrode layer to then flow along the active surface in the horizontal direction and to be, thereafter, carried off through other circular gas passage orifices adjacent to the electrode layer in the vertical direction. In this case the gas flows directly from the inlet orifices to the outlet orifices without detours which is disadvantageous in that a so-called gas short circuit may occur between an inlet orifice and the opposing outlet orifice, i.e. that gas, at least partly, flows from the inlet to the outlet orifice unused without a significant part of the gas being absorbed by the active surface. To avoid such gas short circuits it was already contemplated to provide a very large number of inlet and outlet orifices adjacent to the active surface and a correspondingly large sealing surface which will, however, result in an increased risk of failure.

To obtain a temperature distribution in the fuel cell stack which is as uniform as possible the so-called counter flow and identical flow arrangement may be used. In this case the combustion gas/oxidising gas in a fuel cell flows along the anode/cathode layer in an opposite direction as compared to the adjacent cell. To this end the supplies and the releases for the oxidising gas have to be disposed in the same areas as the supplies and the releases for the combustion gas which is not easy to be realised, particularly when a very large number of inlet and outlet orifices are required for uniformly distributing the gas.

A further problem is posed by the uniform gas distribution to all (typically 30 or 60) levels of the stack. According to calculation the gas distribution is not optimum in case of an identical cross section of the inlet and outlet orifices; it may, for example, occur that the lower levels of the stack have a better gas supply than the upper levels. This again leads to a poor utilisation of the combustion gas and thus to a poor efficiency of the fuel cell stack.

The invention is based on the object to provide a repeating unit for a fuel cell stack which enables a particularly uniform gas distribution across the active surface as well as throughout the entire fuel cell stack.

Said object is solved by the features of claim 1.

Advantageous embodiments and further development of the invention will become obvious from the dependent claims.

The repeating unit according to the invention is based on the generic state of the art in that a gas-tight gas flow barrier is disposed between the active surface and the gas passage orifice so that gas passing the gas passage orifice flows around the gas flow barrier, the projection of the gas flow barrier towards the edge of the active surface having at least half the length of the projection of the gas passage orifice towards the edge of the active surface (aside from the factor 0.5 the factors 0.75, 1 and 1.25 are also preferred). The invention is based on the finding that gas short circuits can be avoided by preventing the supplied gas from flowing directly from an inlet orifice to an outlet orifice by means of such a barrier. The barrier causes the introduced gas to first flow in the direction of an outer fringe of the fuel cell to then be deflected by the fringe and the barrier towards the active area. A particularly broad barrier, i.e. a barrier having a large projection towards the edge of the active surface as compared to the inlet orifice, in this case results in a particularly save protection from gas short circuits. The gas flow barrier may, for example, be realised by a so-called inserted spacer. It may, however, for example also be realised by a corresponding coining of the flow field plate.

It is considered particularly advantageous that the gas flow barrier is tapered in the direction towards the active surface. This enables a particularly uniform gas distribution towards the edge of the active surface. In particular a good gas supply is also ensured in the section of the active surface disposed in the "shadow" of the gas flow barrier.

In this connection it is advantageous that the gas flow barrier essentially has the shape and orientation of a "V" or "U" the open side of which is opposed to the active surface. A barrier tapered in a U- or V-shape is mirror symmetric and the gas may therefore flow around it in an at least approximately symmetric manner.

It may further be advantageous that the gas passage orifice is tapered in the direction towards the active surface. Particularly in combination with a tapered gas flow barrier the gas flow passing through the gas passage orifice is thus continuously widened or (depending on the flow direction) narrowed.

In a particularly preferred embodiment a narrowing of the gas passage orifice in the direction towards the active surface is realised by a gas passage orifice having a substantially triangular shape with rounded corners. This shape is particularly simple geometrically.

It is particularly useful that the described gas passage orifice is designed for supplying gas to the active surface and that the flow field comprises a second gas passage orifice for discharging gas from the active surface, wherein a gas-tight second gas flow barrier is provided between the active surface and the second gas passage orifice so that gas passing through the second gas passage orifice and having flown over at least part of the active surface flows around the second gas flow barrier, wherein the projection of the second gas flow barrier towards the edge of the active surface is at least half as long as the projection of the second gas passage orifice towards the edge of the active surface. In this way an embodiment is realised in which the flow field is designed according to the invention with respect to the supply as well as to the discharge of the gas from the active surface whereby the advantages of the invention explained above are useful for the supply as well as for the discharge.

In this connection it is desirable that the second gas passage orifice provided for discharging the gas has a larger cross sectional area than the first gas passage orifice provided for supplying the gas. According to fluid dynamic calculation thus a better pressure distribution over the entire fuel cell stack is obtained.

A particularly preferred embodiment of the repeating unit according to the invention is characterised in that the active surface is substantially rectangular and divided into one or more substantially rectangular supply areas, wherein a first gas passage orifice for supplying gas and a second gas passage orifice for discharging gas are allocated to each supply area. In this way a plurality of gas passage orifices according to the invention and allocated gas flow barriers are advantageously combined to form a larger flow field. The rectangular division enables a uniform gas supply to the entire active surface in a particularly simple manner.

In this connection it is useful that the first gas passage orifice and the second gas passage orifice are disposed on a central axis of the supply area allocated to them since said arrangement is particularly simple geometrically and the gas, after having flown around the first gas flow barrier in a substantially straight direction, is lead to a corresponding gas flow barrier on the opposite side of the fuel stack while possible perturbing effects, possibly caused by partial flows intermingling in a turbulent manner, are avoided.

In the preferred embodiment of the repeating unit according to the invention the outer fringe of the flow field is designed so as to be streamlined as shown, for example, in FIG. 3. In this way a flow which is as laminar as possible is ensured even in the outer peripheral area of the flow field.

The invention will now be explained by way of example quoting particularly preferred embodiments with reference to the accompanying drawings in which:

FIGS. 1a, 1b respectively show a schematic plan view of two similar flow fields corresponding to the state of the art;

FIG. 2 shows a schematic plan view of a partial area of a flow field according to a preferred embodiment of the invention comprising a gas passage orifice;

FIG. 3 shows a schematic cross sectional view of the partial section shown in FIG. 2 along the intersection line A-A;

FIG. 4 shows the projection of a gas passage orifice and the projection of the allocated gas flow barrier towards the edge of the active area;

FIG. 5 shows a schematic plan view of a substantially rectangular flow field according to a preferred embodiment of the invention comprising two gas passage orifices.

In the Figures the same or similar numerals (for example numerals displaced by an amount of 100) designate the same or similar components which are, at least partly, only explained once for avoiding repetitions.

Figure 1A:
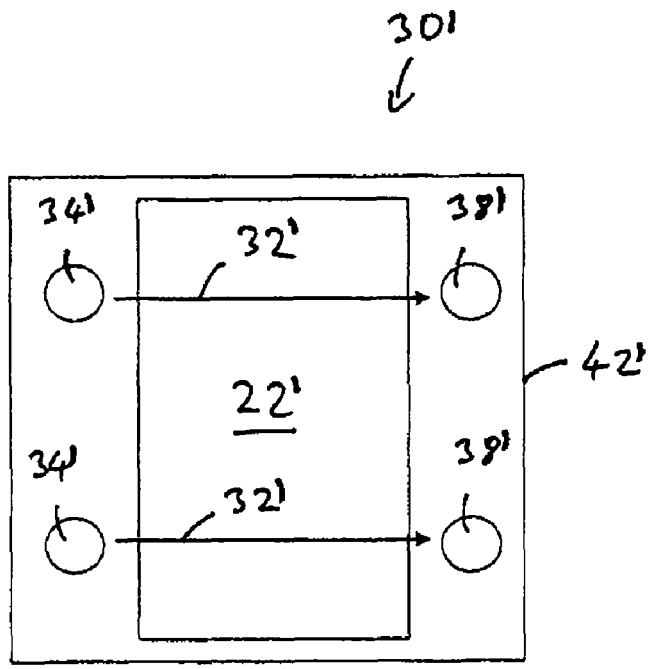

FIG. 1a illustrates a flow field 30' of a fuel cell according to the state of the art. On two opposite sides of a rectangular active surface 22' (which are assumed to be horizontal here) respectively two first gas passage orifices 34' for introducing gas 32' and respectively two second gas passage orifices 38' for discharging gas 32' are disposed so that during a normal operation of the fuel stack the gas is first discharged from the first gas passage orifices 34' in the vertical direction and then flows horizontally across the active surface 32' (the composition of the gas 32' usually being changed by absorption and by mixing with gas discharged by the active surface) and is finally discharged in the vertical direction through the second gas passage orifices 34'. In the arrangement shown the mutual distance between the two first gas passage orifices is large compared to their diameters which results in an unsatisfactory gas distribution in connection with the risk of a gas short circuit between a first gas passage orifice 34' and the opposed second gas passage orifice 38' illustrated by the arrows.

To achieve a gas distribution which is as uniform as possible over the entire active surface 22' the gas passage orifices may be arranged in relatively short mutual distances. A corresponding geometry comprising a total of four gas passage orifices 34', 38' towards each side of the active surface 22' is lined out in FIG. 1b.

Figure 1B:
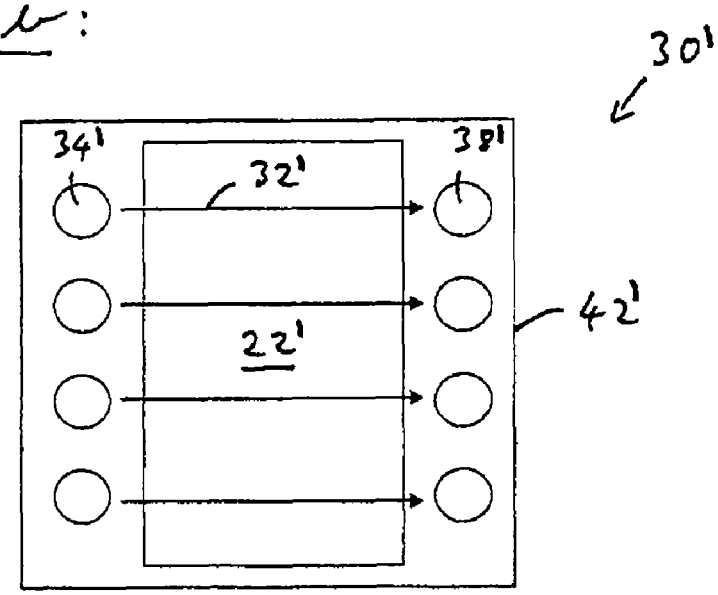

Further the gas passage orifices 34', 38' shown in FIG. 1a and in FIG. 1b for supplying and removing gas have the same cross section.

FIG. 2 is a horizontal cross section along the broken line in FIG. 3 through a partial section of a flow field 30 comprising an outer fringe 42 and a gas passage orifice 34 for supplying gas to an active surface 22. The gas passage orifice 34 and the active surface 22 are arranged in a common horizontal plane. The contour of the gas passage orifice 34 is substantially the contour of an isosceles triangle having rounded corners. The isosceles triangle is, in this case, oriented so that its distinguished corner is directed towards the active surface 22. Along the two legs of the triangle having identical lengths a wall like vertical gas flow barrier 36, i.e. a gas flow barrier arranged perpendicular to the plane defined by the gas passage orifice 34, extends the projection of which in direction towards the active area 22 is slightly longer than the projection of the gas passage orifice 34 in direction towards the active area 22. Gas 32 flowing into the flow field 30 through the gas passage orifice 34 from below is prevented from directly flowing onto the active surface 28 by the gas flow barrier 36. The gas flow barrier 36 causes the gas 30 to first flow in direction of a fringe 42. The fringe 42 again causes the gas 32 to flow around the gas flow barrier 36 along its two legs to reach the active surface 22. The triangular shape and the orientation of the gas passage orifice 34 as well as the shape of the gas flow barrier 36 partly clinging to the contour of the gas passage orifice 34 result in only a narrow part of the gas flow barrier 36 blocking the active surface 22. It can be seen that the blocked peripheral portion of the active surface 22 is small as compared to the projection of the gas passage orifice 34 on the periphery of the active surface 22. Aside from the short, blocked peripheral portion the gas 30 can enter the active portion on the entire periphery so that virtually the entire active surface 22 can be supplied with gas 32.

FIG. 3 is a cross section through the arrangement shown in A-A 2, along the broken line in FIG. 2. The active surface 22 is the surface of an anode layer 24. The anode layer 24 is separated from a cathode layer 28 by an electrolyte membrane 26. The anode layer 24, the electrolyte membrane 26 and the cathode layer 28 together form the membrane electrode assembly (MEA) 20. Adjacent to the MEA the gas passage orifice 34 is disposed through which the gas 32 flowing in enters the flow field 30 where it reaches the active surface 22 after having flown around the gas flow barrier 36 (outside of the cross sectional plane).

FIG. 4 explains the gas passage orifice 34 and its projection P34 to the periphery of the active area 22 as well as the gas flow barrier 36 and its projection P36 to the periphery of the active area 22. According to the invention the projection P36 of the gas flow barrier 36 is at least half as long as the projection P34 of the gas passage orifice 34. In the embodiment shown the projection P36 of the gas flow barrier 36 is even longer than the projection P34 of the gas passage orifice 34.

FIG. 5 is a plan view of a flow field 30 of a fuel cell stack according to a particularly preferred embodiment. A rectangular active surface 22 is divided into two identical supply areas 44a and 44b to each of which a respective gas passage orifice 34 for introducing a gas 32 and a respective gas passage orifice 38 for removing the gas 32 are allocated, wherein the orifices 34 and 38 are disposed on a symmetry axis of the rectangular supply area 44a or 44b. The flow field 30 is defined by a outer fringe 42 which is streamlined to ensure a possibly laminar, turbulence-free progression of the flow in the flow field. The discharge of the gas 32 from the gas passage orifices 34 into the direction opposite of the active surface 22 drastically reduces the risk of a gas short circuit between the inlet and outlet gas passage orifices 34, 38. The geometry of the gas passage orifices 34 and 38 explained above in combination with the gas flow barriers 36 and 40 results in that a uniform gas distribution over the active surface will develop as it may only be achieved in the state of the art by approximately double the number of gas passage orifices with an active surface of the same size. The illustrated geometry according to the invention is advantageous due to a reduced number of sealing surfaces, reduced space requirements as well as an almost unhindered admission of air to all sectors of the active surface 22. The gas passage orifices 38 provided for discharging the gas from the active surface 22 further have a larger cross section than the gas passage orifices 34 provided for introducing it by which also a more uniform gas distribution across the repeating units of the fuel cell stack is supported.

Figure 6:
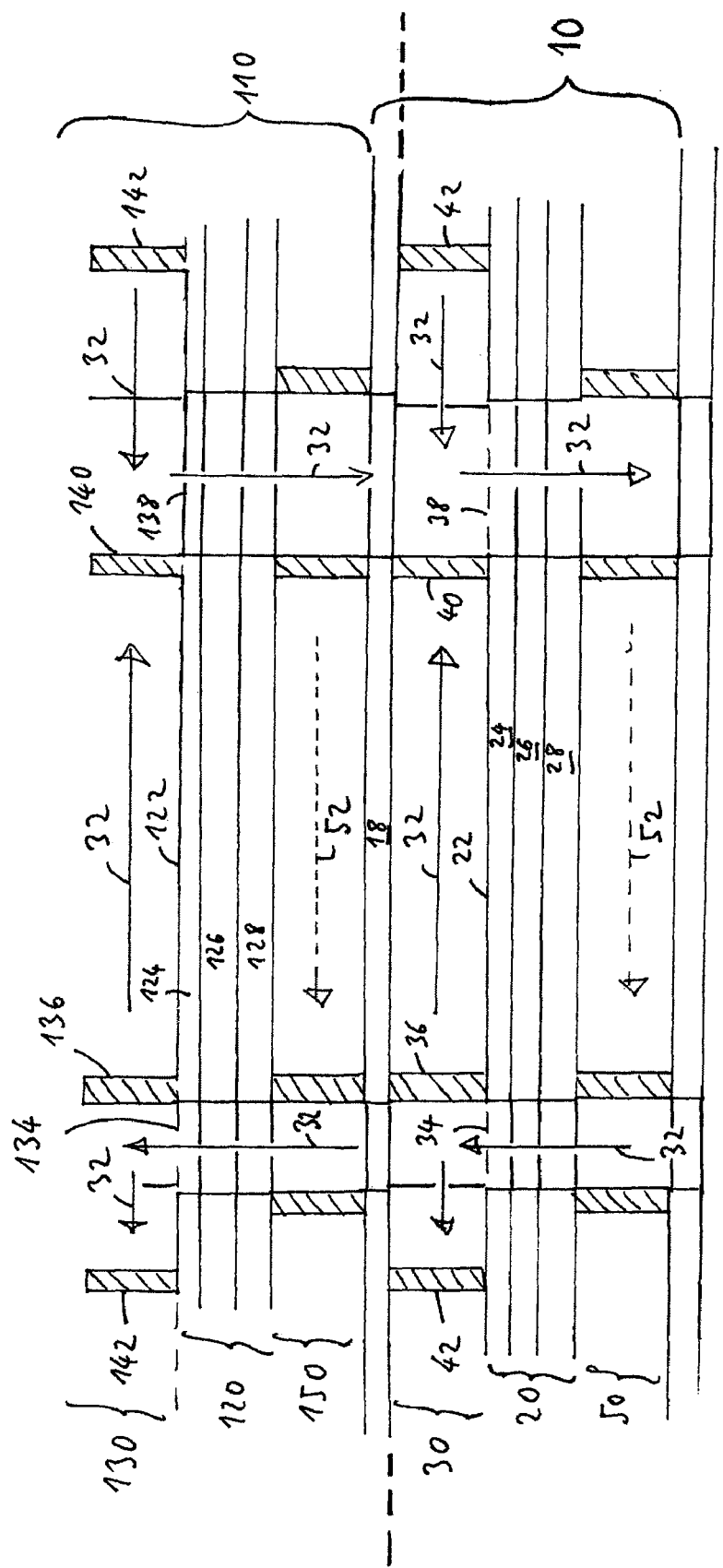
FIG. 6 shows a schematic cross sectional view of the flow field shown in FIG. 4.

FIG. 6 is a cross sectional view along the upper broken line in FIG. 5. It illustrates a possible vertical design of a fuel cell stack according to the invention comprising at least two repeating units 10, 110 each comprising a membrane electrode assembly (MEA) 20, 120. The first repeating unit 10 is covered by a bipolar plate 18 following the second repeating unit 110. The illustrated embodiment is designed so that combustion gas 32 is passed through the repeating units 10 and 110 in the same direction (from the left to the right in the drawing), respectively. However, a counter flow arrangement (not shown) is also technically realisable. In the illustrated embodiment (parallel flow arrangement) combustion gas 32 enters flow fields 30, 130 comprising the gas flow barriers 36, 136 according to the invention explained above through gas passage orifices 34, 134 according to the invention explained above to distribute the combustion gas 32 over the active surfaces 22, 122. The portion of the combustion gas 32 which is not burned as well as the gas discharged by the anode layers 24, 124 is discharged via larger gas passage orifices 38, 138 described above. Between the bipolar plate 18 of the first repeating unit 10 and the cathode layer 128 of the second repeating unit 110 there is a flow field 150 taken from the state of the art to date for distributing oxidising gas/air 52 which will not be explained in detail here. However, a fuel cell stack is feasible in which the flow fields for distributing the combustion gas as well as the flow fields for distributing the oxidising gas or only the latter are designed in accordance with the present invention.

The features of the invention disclosed in the above description, in the drawings as well as in the claims may be important for the realisation of the invention individually as well as in any combination.

The invention claimed is:

1. A repeating unit for a fuel cell stack comprising a membrane electrode assembly and a flow field designed to supply an active surface of the membrane electrode assembly with gas and comprising at least one gas passage orifice, characterised in that a gas-tight gas flow barrier is provided between the active surface and the at least one gas passage orifice so that gas passing through the at least one gas passage orifice flows in a direction opposite of the active surface and around the gas flow barrier, wherein a projection of the gas flow barrier to the periphery of the active surface is at least half as long as the projection of the at least one gas passage orifice to the periphery of the active surface.

2. The repeating unit of claim 1, wherein the gas flow barrier is tapered in the direction to the active surface.

3. The repeating unit of claim 2, wherein the gas flow barrier has, substantially, the shape and orientation of a "V" or "U" the opening of which is opposed to the active surface.

4. The repeating unit of claim 1, wherein the at least one gas passage orifice is tapered in direction to the active surface.

5. The repeating unit of claim 4, wherein the at least one gas passage orifice has, substantially, the shape of a triangle with rounded corners.

6. The repeating unit of claim 1, wherein the at least one gas passage orifice has a first gas passage orifice designed for supplying gas to the active surface and the flow field comprises a second gas passage orifice for discharging gas from the active surface, wherein a gas-tight second gas flow barrier is provided between the active surface and the second gas passage orifice so that gas entering through the second gas passage orifice and having flown over at least a part of the active surface flows around the second gas flow barrier, wherein the projection of the second gas flow barrier to the periphery of the active surface is at least half as long as the projection of the second gas passage orifice to the periphery of the active surface.

7. The repeating unit of claim 6, wherein the second gas passage orifice provided for discharging the gas has a larger cross sectional area than the first gas passage orifice provided for supplying the gas.

8. The repeating unit of claim 4, wherein the active surface is substantially rectangular and divided into one or more substantially rectangular supply areas, wherein the at least one gas passage orifice comprises a first gas passage orifice for supplying gas and a second gas passage orifice for discharging gas are allocated to each supply area.

9. The repeating unit of claim 7, wherein the first gas passage orifice and the second gas passage orifice are disposed on a central axis of the supply area allocated to them.

10. The repeating unit of claim 1, wherein the outer fringe of the flow field is streamlined.

11. A fuel cell stack, comprising at least one repeating unit of claim 1.

* * * * *